(No Model.)
F. A. BUESCHER.
DEVICE FOR INFLATING PNEUMATIC TIRES.
No. 563,839. Patented July 14, 1896.
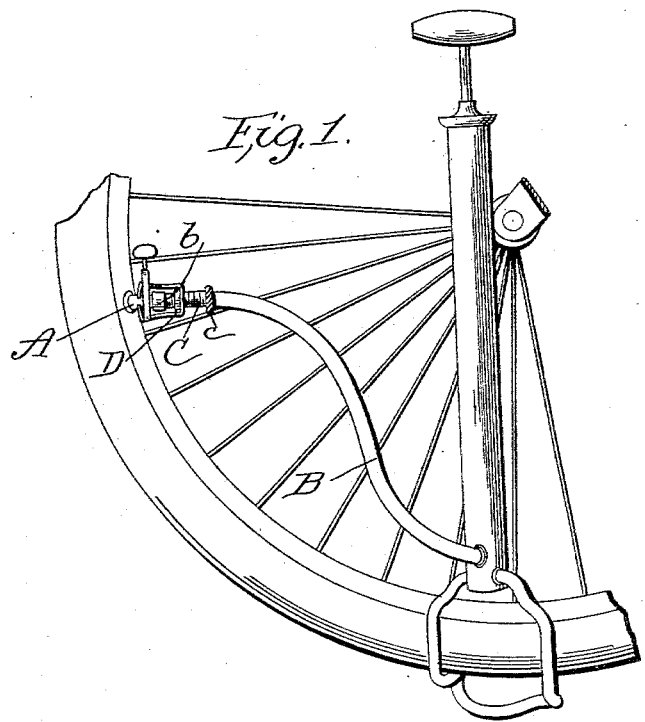
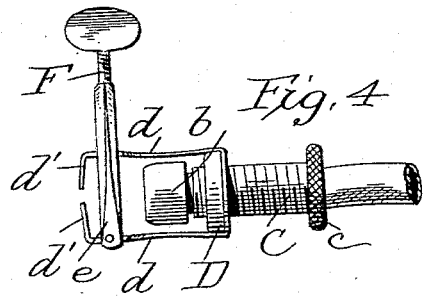
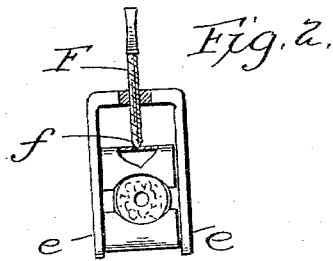
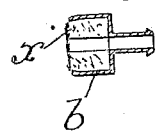
Attest
Kathinka Donaldson
R.C. Ourand
Inventor
Ferdinand A. Buescher
by Walter Donaldson
Attys.

UNITED STATES PATENT OFFICE.

FERDINAND AUGUSTUS BUESCHER, OF ELKHART, INDIANA, ASSIGNOR TO THE BUESCHER MANUFACTURING COMPANY, OF SAME PLACE.

DEVICE FOR INFLATING PNEUMATIC TIRES.

SPECIFICATION forming part of Letters Patent No. 563,839, dated July 14, 1896.

Application filed September 19, 1895. Serial No. 562,967. (No model.)

*To all whom it may concern:*

Be it known that I, FERDINAND AUGUSTUS BUESCHER, a citizen of the United States, residing at Elkhart, in the State of Indiana, have invented certain new and useful Improvements in Devices for Inflating Pneumatic Tires, of which the following is a specification, reference being had therein to the accompanying drawings.

My invention relates to improvements in devices for inflating pneumatic tires.

The object of the invention is to provide an attachment for the inflating-tube which connects with the pump, whereby the said tube may be held securely against valves of various sizes to provide a perfectly tight joint.

The invention is illustrated in the accompanying drawings, in which—

Figure 1 is a view showing the inflating-tube applied to the valve of a tire to be inflated. Fig. 2 is an enlarged detail view of the connecting device, partly broken away. Fig. 3 is a sectional view; Fig. 4, a side view of the device.

In the drawings, A represents the valve of a pneumatic tire, and B the rubber pipe or tube leading from the pump or similar source of air supply. The end of this tube is surrounded by a collar $b$, rigidly secured thereto, and in rear of this collar is located a tubular sleeve C, having a threaded exterior surface and a corrugated or roughened flange $c$. The sleeve is loosely mounted on the tube, so that it can be freely rotated thereon by the roughened flange, and its forward end is adapted to bear against the collar $b$, as hereinafter described.

A collar D is threaded upon the sleeve and is provided with forwardly-extending arms $d$, which are bent inward at their forward ends, as shown at $d'$, and preferably recessed at their opposing edges to adapt them to be clamped upon the valve-tube. A yoke has the extremities of its arms $e$ pivoted to one of the arms $d$ and embraces the other arm $d$, and a thumb-screw F is provided, extending through an opening in the yoke, with its end bearing against the outer face of the arm $d$ between the arms of the yoke. The end of the screw is preferably pointed, as at $f$, and engages a slight depression in the arm $d$ to prevent it from slipping.

In the operation of the device the arms $d\ d$ are placed over the valve-tube, as shown in Fig. 1, and are securely clamped thereon by tightening the thumb-screw. The sleeve is then rotated by its roughened flange to screw it inward in the direction of the valve, and by its bearing against the collar $b$ it forces the said collar, and with it the tube B, firmly against the mouth of the valve. A short piece of tubular rubber, preferably arranged at X in the collar, serves as a washer or packing and all leakage of air is absolutely prevented.

It will thus be seen that a device is provided which can be quickly secured to valves of any size or shape and can be as quickly removed, and that the joint is an air-tight one, and, further, that the parts are simple, durable, and not likely to get out of order. The collar $b$ (shown in detail in Fig. 3) forms the bearing end for the tube B.

Having thus described my invention, what I claim is—

1. In combination the air-supply tube, the bearing-collar secured thereon, the sleeve rotatably mounted on the tube, the collar threaded upon said sleeve and having forwardly-extending clamping-arms, and means for clamping the arms upon the tire-valve, substantially as described.

2. In combination the air-supply tube, the bearing-collar secured thereon, the sleeve rotatably mounted on the tube, the collar threaded upon the sleeve and having forwardly-extending clamping-arms with inwardly-turning ends, the yoke having its arms pivoted to one of the clamping-arms and embracing the other clamping-arm, and the thumb-screw for forcing said arms together, substantially as described.

In testimony whereof I affix my signature in presence of two witnesses.

FERDINAND AUGUSTUS BUESCHER.

Witnesses:
    LINN I. ENDERS,
    H. L. YOUNG.